US012332512B1

(12) United States Patent
Jirafe et al.

(10) Patent No.: US 12,332,512 B1
(45) Date of Patent: Jun. 17, 2025

(54) GIMBAL ENCODER

(71) Applicant: WHIRLPOOL CORPORATION, Benton Harbor, MI (US)

(72) Inventors: Shekhar Jirafe, Stevensville, MI (US); Harika Talluri, St. Joseph, MI (US); Joana Jiang, Shenzhen (CN); Roc Qiu, Shenzhen (CN); Sithaarth Subramaniyam, Stevensville, MI (US); Vitor Leobet Lima, Joinville (BR); Dattatray Patil, Pune (IN); Yogesh Chauhan, Ahmedabad (IN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

(21) Appl. No.: 18/779,688

(22) Filed: Jul. 22, 2024

(51) Int. Cl.
G02F 1/1333 (2006.01)
F16M 11/04 (2006.01)
F16M 11/12 (2006.01)

(52) U.S. Cl.
CPC ..... *G02F 1/133308* (2013.01); *F16M 11/041* (2013.01); *F16M 11/123* (2013.01); *G02F 2201/56* (2013.01)

(58) Field of Classification Search
CPC ............ G02F 1/133308; F16M 11/041; F16M 11/123
See application file for complete search history.

(56) References Cited

U.S. PATENT DOCUMENTS

| 5,481,169 A | 1/1996 | Turetta et al. |
| 7,489,309 B2 | 2/2009 | Levin et al. |
| 8,174,512 B2 | 5/2012 | Ramstein et al. |
| 8,218,053 B2 * | 7/2012 | Amano ................. H04N 23/53 348/333.01 |
| 10,074,245 B2 | 9/2018 | Jayaraman et al. |
| 10,281,154 B2 | 5/2019 | Yantis |
| 10,448,462 B2 | 10/2019 | Flesch |
| 10,795,466 B1 | 10/2020 | Lo et al. |
| 11,592,187 B2 | 2/2023 | Babu et al. |
| 2016/0022496 A1 * | 1/2016 | DeKeuster ............. A61F 9/067 349/14 |
| 2023/0356459 A1 * | 11/2023 | Knecht ................. B33Y 10/00 |

FOREIGN PATENT DOCUMENTS

| DE | 102015005863 A1 | 11/2016 |
| EP | 4109203 A1 | 12/2022 |
| WO | 2018116034 A1 | 6/2018 |

* cited by examiner

*Primary Examiner* — Joseph L Williams
(74) *Attorney, Agent, or Firm* — BROOKS KUSHMAN P.C.

(57) ABSTRACT

A gimbal assembly includes a gimbal encoder having a gimbal encoder having a lower fixed section and an upper rotatable section, the gimbal encoder defining a gimbal aperture through an axis of rotation of the upper rotatable section; a liquid crystal display (LCD) housing configured to hold an LCD, the LCD housing defining a flat circular body and an upper stem portion extending perpendicularity downward from the center of the circular body, the upper stem portion being sized to be placed vertically downwards into an upper portion of the gimbal aperture; and a lower adapter defining a lower stem portion sized to be placed vertically upwards into a lower portion of the gimbal aperture, wherein the upper stem portion and the lower stem portion are configured to interface with one another to collectively form a two-piece stem.

20 Claims, 12 Drawing Sheets

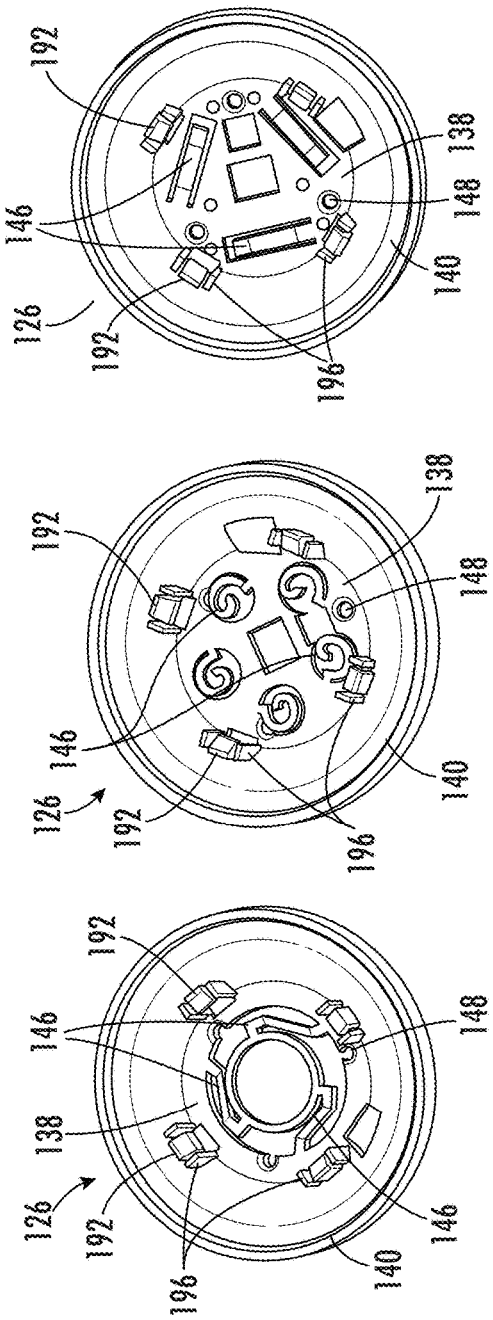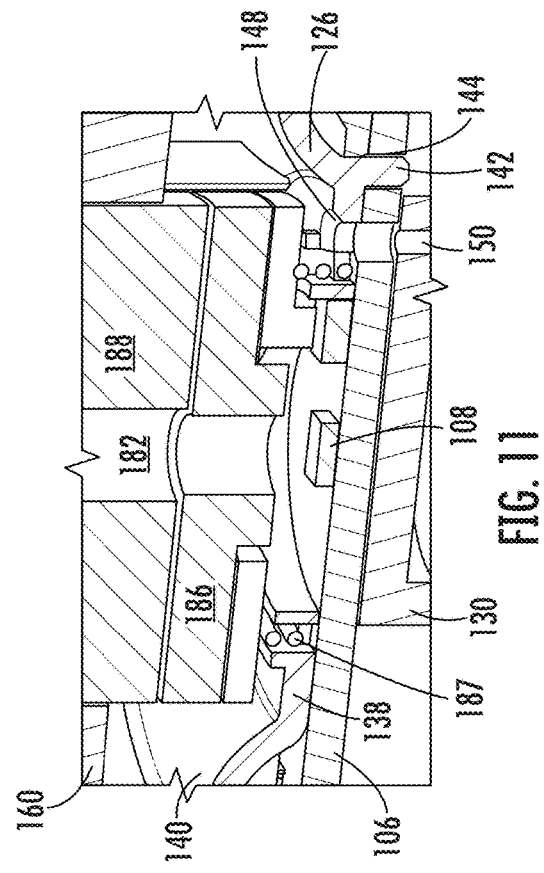

GIMBAL ENCODER

TECHNICAL FIELD

Aspects of the disclosure relate to a gimbal encoder, such as for use in home appliances.

BACKGROUND

A gimbal encoder for a knob is a device used to precisely measure the rotational position and movement of a knob or dial. This type of encoder is particularly useful in applications where accurate control of the knob's position is required, such as in audio equipment, industrial controls, and other user interfaces.

SUMMARY

In one or more illustrative examples, a gimbal assembly includes a gimbal encoder having a lower fixed section and an upper rotatable section, the gimbal encoder defining a gimbal aperture through an axis of rotation of the upper rotatable section. The gimbal assembly further includes a liquid crystal display (LCD) housing configured to hold an LCD, the LCD housing defining a flat circular body and an upper stem portion extending perpendicularity downward from the center of the circular body, the upper stem portion being sized to be placed vertically downwards into an upper portion of the gimbal aperture. The gimbal assembly further includes a lower adapter defining a lower stem portion sized to be placed vertically upwards into a lower portion of the gimbal aperture. The upper stem portion and the lower stem portion are configured to interface with one another to collectively form a two-piece stem.

In one or more illustrative examples, the upper stem portion and the lower stem portion collectively define a wiring channel within the aperture for passing a harness through the two-piece stem.

In one or more illustrative examples, the LCD housing defines a printed circuit board (PCB) indent sized to receive a bridge PCB assembly, the bridge PCB assembly configured to converts signals from the LCD to fewer wired connections for electrical interfacing with the harness and connection to a gimbal PCB assembly.

In one or more illustrative examples, the gimbal assembly further includes a c-clip securing the bridge PCB assembly to the LCD.

In one or more illustrative examples, the gimbal encoder includes a lower fixed section and an upper rotatable section, the lower adapter is attached to the lower fixed section, and the upper stem portion remains fixed with respect to the lower fixed section, preventing the LCD housing from rotating when the knob attached to the upper rotatable section of the gimbal encoder is rotated.

In one or more illustrative examples, the gimbal encoder includes an upper adapter attachable to the upper rotatable section of the gimbal encoder, the upper adapter configured to interface between the knob and the upper rotatable section of the gimbal encoder.

In one or more illustrative examples, a flat upper surface of the upper adapter defines a circumferential groove and a lower surface of the LCD housing defines a corresponding rail configured to be received by the groove, thereby minimizing friction between rotating and stationary parts when the knob is turned.

In one or more illustrative examples, the upper adapter defines knob locators that extend circumferential outward from rounded exterior sides of the upper adapter, the knob locators sized to be received by and lock into open-bottomed apertures defined by an inner surface of the knob.

In one or more illustrative examples, the gimbal encoder includes a gimbal housing defining a generally flat circular center, the lower adapter including a generally flat body contoured on a lower face to fit into the generally flat circular center of the gimbal housing, the gimbal housing configured receive and mount the lower adapter into the gimbal housing.

In one or more illustrative examples, the generally flat circular center is surrounded by a flange extending upwards and outwards from the center, such that a light guide fits between a fascia and the gimbal housing.

In one or more illustrative examples, the lower adapter includes retainer hooks extending laterally outward from the flat body of the lower adapter, and wherein the gimbal housing includes snaps that define sloped latches that ride the retainer hooks during insertion of the lower adapter and that snap back over the top of the retainer hooks to engage the hooks and retain the lower adapter in place.

In one or more illustrative examples, surrounding each of the snaps, the gimbal housing defines snap locators extending inwards towards the center of the gimbal housing, the snap locators serving to guide placement of the retainer hooks into the snaps.

In one or more illustrative examples, the gimbal housing defines a set of cantilever arms providing upward biasing of the lower adapter away from a push button.

In one or more illustrative examples, the lower adapter includes a projection located to activate the push button when the gimbal encoder is pressed and the cantilever arms flex downwards.

In one or more illustrative examples, a first end of each of the cantilever arms is connected to the generally flat circular center of the gimbal housing, and a second end of each of the cantilever arms is connected to an inner circular member.

In one or more illustrative examples, each of the cantilever arms defines a spiral shape connected at a first end to the generally flat circular center of the gimbal housing and extending upwards from the generally flat circular center to a free end.

In one or more illustrative examples, a first outer end of each of the cantilever arms is connected to the generally flat circular center and defines a linear shape extending upwards from the generally flat circular center to a free end.

In one or more illustrative examples, a lower end of the upper stem portion defines two upper arc segments, each of the upper arc segments, and an upper end of the lower stem portion defines two lower arc segments extending upward from the lower stem portion, such that the two upper arc segments and the two lower arc segments mate to connect the upper stem portion and the lower stem portion.

In one or more illustrative examples, the two upper arc segments are defined as a portion of the upper stem portion between two spaced-apart parallel chords centered at the center of the upper stem portion, and the two lower arc segments are defined by an area on the opposite side of the chords defining the upper arc segments.

In one or more illustrative examples, each of the upper arc segments defines a protrusion extending from an opposite one of its side surfaces, and each of the lower arc segments defines a receiving channel sized to receive a corresponding one of the protrusions of the upper arc segments.

BRIEF DESCRIPTION OF THE DRAWINGS

FIG. 10A illustrates a first example alternative housing having varied cantilever features;

FIG. 10B illustrates a second example alternative housing having varied cantilever features;

FIG. 10C illustrates a third example alternative housing having varied cantilever features;

FIG. 11 illustrates an example cutaway perspective view of the alternative gimbal assembly with the gimbal encoder loaded into the housing spaced from the magnetic sensor;

DETAILED DESCRIPTION

Figure 1:
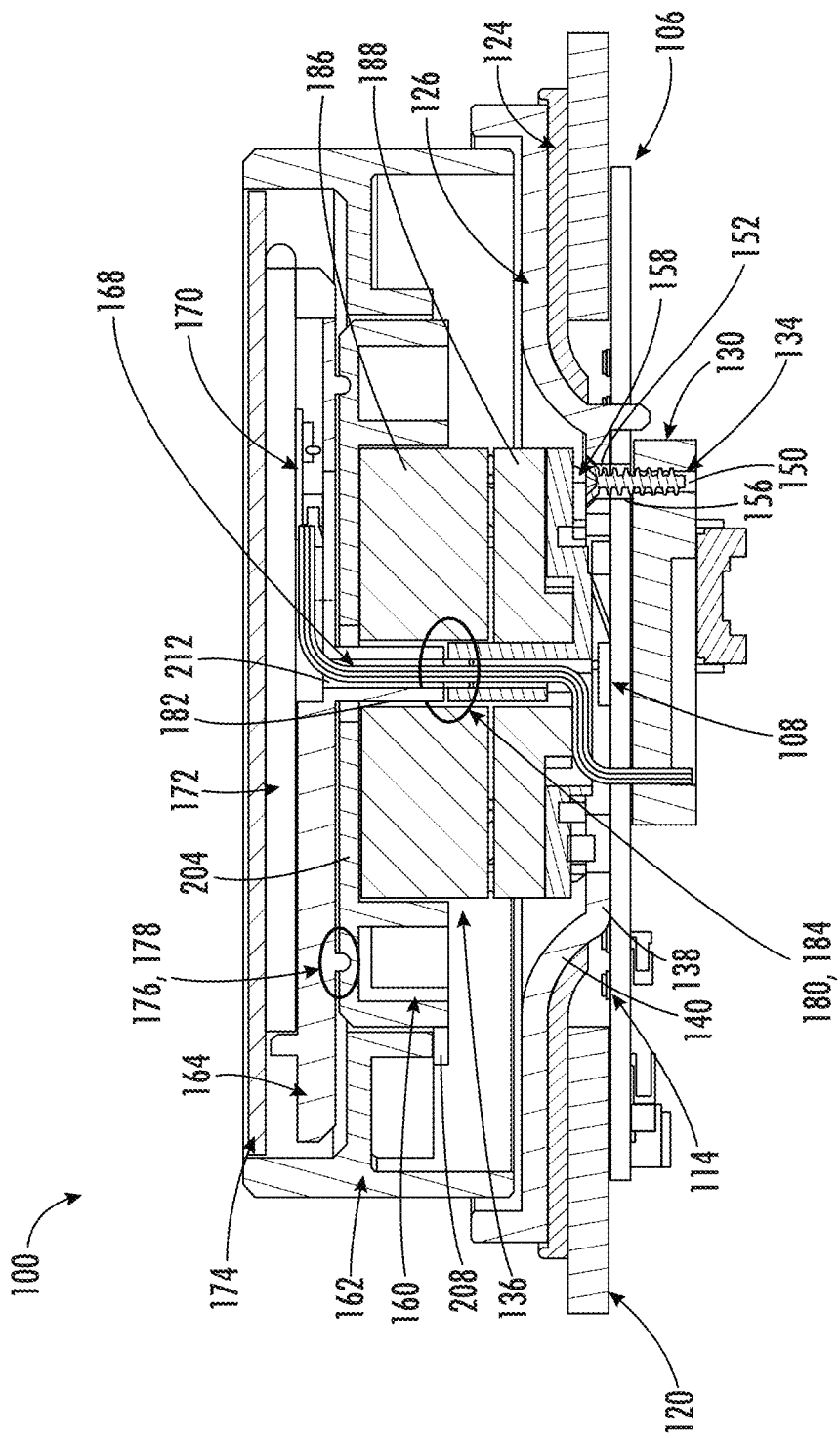
FIG. 1 illustrates an example side cutaway view of the gimbal assembly with a human machine interface (HMI) LCD display.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A gimbal assembly may include a brushless gimbal motor that is paired with a magnetic encoder to provide closed-loop torque feedback control, making it possible to dynamically create and adjust the feel of detents and end stops. The gimbal motor may be used to create a flexible electronic knob with programmed detents, torques, and feel for different products.

A gimbal assembly including a gimbal encoder may be used as a primary knob, controlling other functionality such as touch boards, other knobs, and/or other HMI elements. The gimbal assembly may also behave as a secondary knob that is controllable from other HMI elements. The knob may include a brushless gimbal motor paired with a magnetic encoder to provide closed-loop torque feedback control, making it possible to dynamically create and adjust the feel of detents and stops. The gimbal encoder may be created in versions with or without an HMI LCD display. It should be noted that while the display is discussed herein as being an LCD display, other technologies of display screen may be used, such as organic light emitting diode (OLED), light emitting diode (LED), active matrix organic light emitting diode (AMOLED), micro light emitting diode (MicroLED), plasma, electronic ink (e-Ink), digital light processing (DLP), cathode ray tube (CRT), quantum dot, mini light emitting diode (Mini-LED), etc.

The gimbal assembly may provide various electronic features to facilitate use of the knob. In an example, the number of detents can be adjusted via a parameter (range: 8 to 36 or more). In another example, torque can be adjusted via a parameter (range: Maximum to 0). In yet another example, a spring angle can be adjusted via a parameter (range: 15° to) 90°. By configuration of the features of the gimbal encoder, a single product can have different menus with different encoders. Additionally, various products may be able to reuse the same gimbal encoder.

The gimbal assembly may provide various mechanical features to enhance the assembly of the gimbal encoder. In an example, a multiple piece locking stem is provided through which a wiring harness can pass. In another example, a bridge PCB assembly is provided for converting signals into fewer connections, to reduce the wiring threaded through the locking stem. In yet another example, an adapter component is provided for locating the gimbal motor and defining a cantilever feature. These and other aspects of the gimbal assembly are discussed in detail herein.

Figure 2:
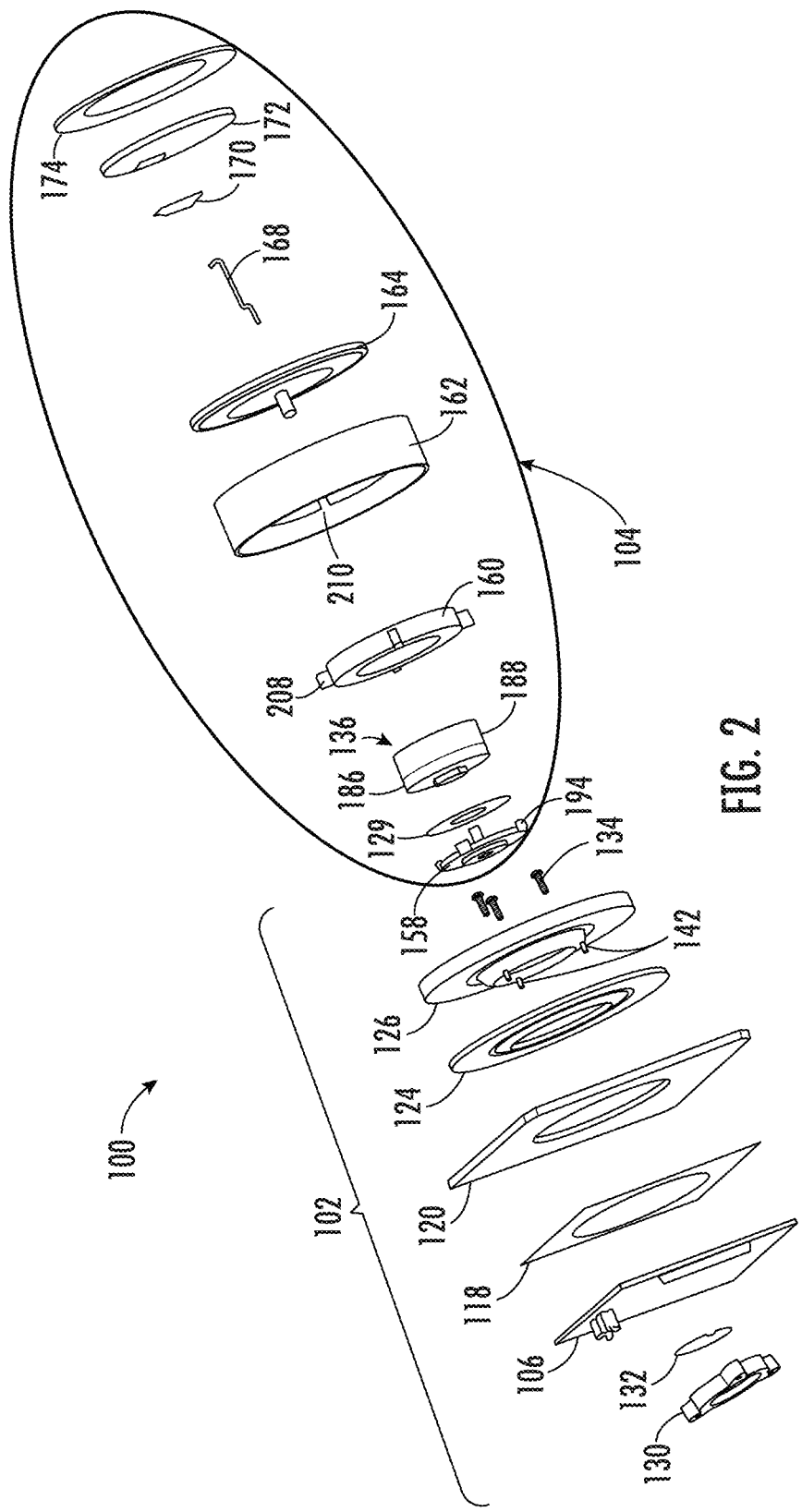
FIG. 2 illustrates an example exploded view of the gimbal assembly of FIG. 1.

FIG. 1 illustrates an example side cutaway view of a gimbal assembly 100 with an HMI display. FIG. 2 illustrates an exploded view of the gimbal assembly 100. The gimbal assembly 100 may generally comprise fixed components 102, and movable components 104 rotatably attached to the fixed components 102. The fixed components 102 may include a gimbal PCB assembly 106 having a magnetic sensor 108, small three phase motor driver 111, LED driver 113, 2x sideboards connectors 112, microcontroller 114, and a push button 116. A PCB adhesive 118 may attach the gimbal PCB assembly 106 to a fascia 120. Above the fascia 120, the fixed components 102 may include a light guide 124 and then a gimbal housing 126 with spring back cantilever feature. Below the fascia 120, the fixed components 102 may include a washer 130, which may be attached to the underside of the gimbal PCB assembly 106 with washer adhesive 132. The light guide 124 and gimbal housing 126 may be secured to the upper face of the fascia 120 with screws or other fasteners 134, which may extend through the fascia 120 into the washer 130.

The movable components 104 may include a gimbal encoder 136. The bottom of the gimbal encoder 136 may be attached to a lower adapter 158 (a gimbal-to-housing adapter) using gimbal adhesive 154. The lower adapter 158 may be designed to snap mount into the gimbal housing 126. The top of the gimbal encoder 136 may be attached to an upper adapter 160 (a knob-to-gimbal adapter), in turn onto which a knob 162 is attached. The knob 162 may include an LCD housing 164, a harness 168, a bridge PCB assembly 170, an LCD 172, and an LCD window 174.

Regarding the fixed components 102, the gimbal PCB assembly 106 defines a generally flat surface onto which the various components of the gimbal assembly 100 are mounted. The surface of the gimbal PCB assembly 106 may facilitate the mounting of a magnetic sensor 108 for measuring the position of the gimbal encoder 136, a push button 116 for recognizing pressing of the knob 162, LEDs 114 for providing lighting effects and other information through the light guide 124 surrounding the knob 162 and a gimbal PCB connector 112 for receiving the harness 168.

The fascia 120 may define an aesthetic and structural portion of the gimbal assembly 100. The fascia 120 may be formed of various materials such as glass or plastic and may define a generally circular through hole 244 into which the components of the gimbal encoder 136 are mounted. Significantly, the gimbal PCB assembly 106 may be attached to the back of the fascia 120 such that the distance between the magnetic sensor 108 of the gimbal PCB assembly 106 is spaced apart from the gimbal encoder 136 within a predefined maximum operating condition (e.g., such that the gap between the gimbal encoder 136 and the magnetic sensor 108 is less than 2.00 mm).

The PCB adhesive 118 may be applied to secure the gimbal PCB assembly 106 to the fascia 120. For instance, in the case of a glass fascia 120, PCB adhesive 118 may be applied to the upper adapter 160 (not shown) and lower faces of the glass fascia 120 to secure the light guide 124, gimbal housing 126, and/or gimbal PCB assembly 106 to the fascia 120. In other examples, the PCB adhesive 118 may only be applied to the lower surface of the fascia 120 (as shown) for securing to the gimbal PCB assembly 106.

The light guide 124 may be of a transmissive material configured to evenly transfer light from the LEDs 114 of the gimbal PCB assembly 106 to the perimeter of the knob 162. As shown, the light guide 124 defines a generally circular shape with a centered circular opening 125 configured to receive the gimbal housing 126. The light guide 124 may overlay the LEDs 114 to direct the light from the LEDs 114 around the knob 162. When the gimbal assembly 100 is assembled, the light guide 124 may be sandwiched between the fascia 120 and the gimbal housing 126.

The gimbal housing 126 is a structural component of the gimbal assembly 100 that provides an interface for holding the lower adapter 158 and, in turn, holding the stationary portion of the gimbal encoder 136 into the gimbal assembly 100. As best seen in FIGS. 10A-10C, the gimbal housing 126 defines a generally flat circular center 138, surrounded by a flange 140 extending upwards and outwards from the center 138.

The gimbal housing 126 may further define one or more housing locators 142 extending downwards from the center 138, which may be placed into corresponding locator openings 144 in the gimbal PCB assembly 106 to facilitate placement of the gimbal housing 126.

The gimbal housing 126 may additionally define a set of cantilever arms 146 providing upward biasing of the lower adapter 158 away from the push button 116. The dimensions of the cantilever arms 146 may define the push force and travel distance of the push button 116. Moreover, the cantilever arms 146 may preload the gimbal encoder 136, which prevents the knob 162 from excessive wobbling.

Figure 9:
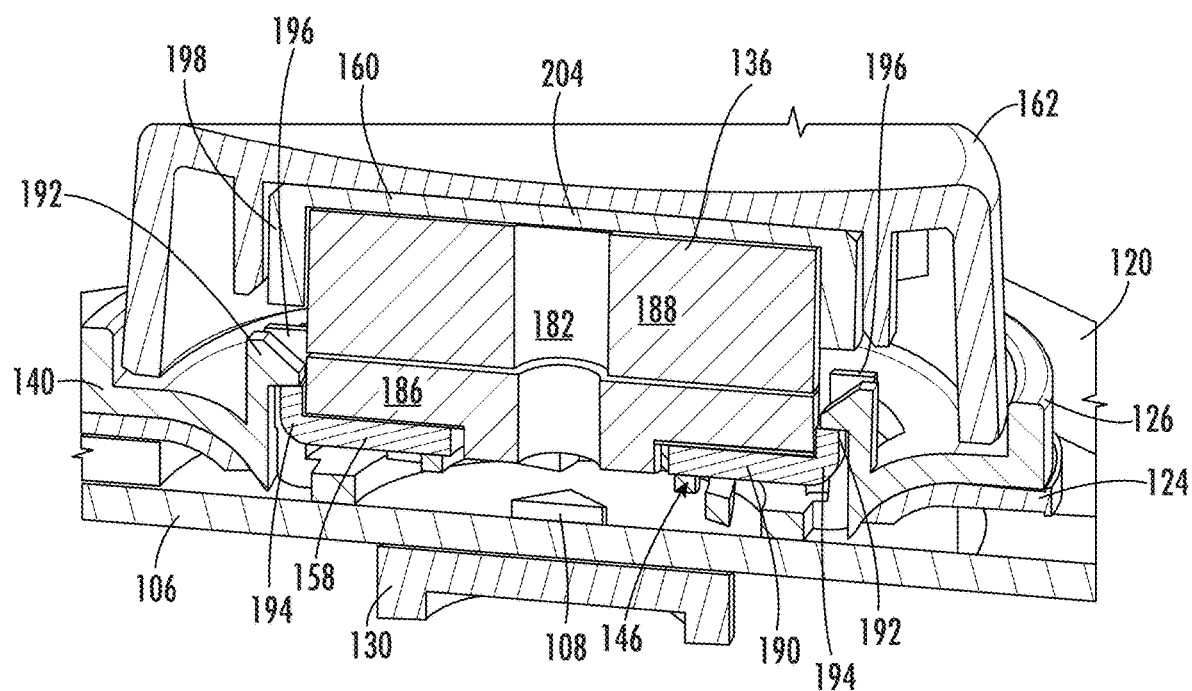
FIG. 9 illustrates an example cutaway perspective view of the alternative gimbal assembly with the attachment of the movable components into the fixed components.
Figure 12:
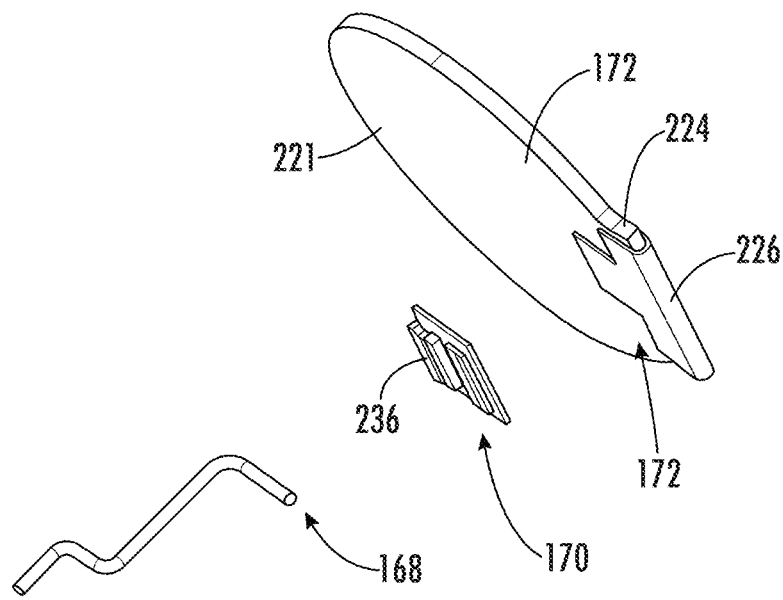
FIG. 12 illustrates the liquid crystal display (LCD) housing, latch, bridge printed circuit board (PCB) assembly and harness before assembly.

The gimbal housing 126 may define apertures 148 to facilitate the securing of the gimbal housing 126 through the gimbal PCB assembly 106 and into the washer 130 plastic at the back of the gimbal PCB assembly 106. In doing so, the flange 140 of the gimbal housing 126 may sandwich the light guide 124 to the fascia 120. The securing may be provided via the fasteners 134, as best shown in FIGS. 9 and 12.

The washer 130 may define threaded holes 150 to retain the fasteners 134. As shown, the gimbal housing 126 defines a set of three spaced apart apertures 152 that line up with corresponding through holes 156 in the gimbal PCB assembly 106 and the threaded holes 150 of the washer 130. Further details of the assembly of the fixed components 102 of the gimbal assembly 100 onto the fascia 120 are discussed in detail with respect to FIG. 5.

Regarding the movable components 104, the gimbal encoder 136 may be any of various motorized encoders that provide various functions to the gimbal assembly 100. The gimbal encoder 136 may include a lower fixed section 186 that operates as a base, and an upper rotatable section 188 for attachment of the knob 162. The gimbal encoder 136 may include a motor that enables the gimbal encoder 136 to automatically adjust the position of the knob 162 based on external commands. The motor may also be used to dynamically create and adjust the feel of detents and end stops.

The magnetic sensor 108 may be configured to detect and measure the position and movement of the upper rotatable section 188 of the gimbal encoder 136. The upper rotatable section 188 may include one or more magnets, while the magnetic sensor 108 is positioned below on the gimbal PCB assembly 106. As the upper rotatable section 188 rotates, the relative position of the magnets changes, and the magnetic sensor 108 detects these changes in the magnetic field. This information is then converted into electronic signals that represent the precise position and movement of the gimbal encoder 136.

The lower adapter 158 may be configured to interface between the gimbal housing 126 and the lower fixed section 186 of the gimbal encoder 136. The lower adapter 158 may serve to receive the lower fixed section 186 of the gimbal encoder 136 and locate the gimbal encoder 136 for attachment to the gimbal housing 126. To do so, the lower adapter 158 may define a generally flat body 190, contoured on the lower face to fit into a generally flat circular center 128 of the gimbal housing 126. Further details of the assembly of the lower adapter 158 into the gimbal housing 126 are discussed in detail with respect to FIGS. 8-9.

The lower adapter 158 may be installed to the gimbal encoder 136 using various approaches such as via adhesive and/or screws or other fasteners (not shown). Once installed to the gimbal encoder 136, the lower adapter 158 may be snapped into the gimbal housing 126, thereby preventing the stationary part of the gimbal encoder 136 from rotating along with the knob 162.

Figure 4:
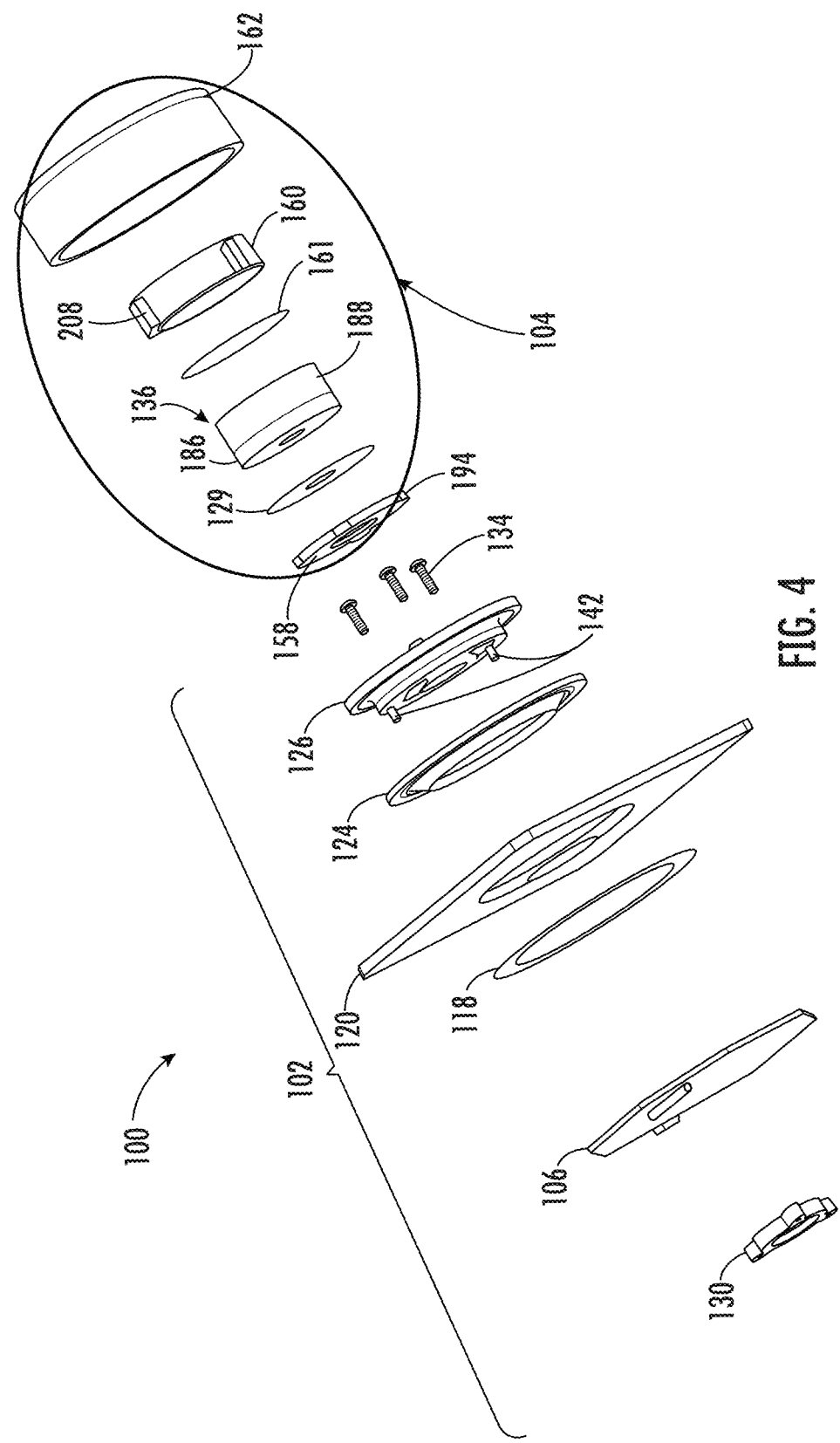
FIG. 4 illustrates an example exploded view of the alternate gimbal assembly of FIG. 3.

The upper adapter 160 may be configured to interface between the knob 162 and the upper rotatable section 188 of the gimbal encoder 136. The upper adapter 160 may define a generally cylindrical shape, with an open bottom, rounded exterior side 198, and a flat upper surface 204. The upper adapter 160 may be affixed with adhesive 161 (as shown in FIG. 4) and/or screws or other fasteners (not shown) to the upper rotatable section 188 of the gimbal encoder 136.

The knob 162 may define the aesthetic surface of the gimbal assembly 100 that interfaces with the upper adapter 160. The knob 162 may be a machined metal part or a molded plastic with various finishes (e.g., chrome plated, Vacuum deposition, in mold labeling (IML), in mold decoration (IMD), etc.). The knob 162 may define a generally cylindrical shape, with rounded sides 202 defining an open bottom, and a flat upper surface 204. For gimbal assemblies 100 that have a display, the flat upper surface 204 defines an upper space 206 for accommodating the LCD window 174, LCD 172, and LCD housing 164.

One or more knob locators 208 may extend circumferential outward from the rounded exterior sides 198 of the upper adapter 160. The knob locators 208 may be sized to be received and locked into open-bottomed apertures 210 defined by the inner surface of the rounded sides 202 of the knob 162. The upper adapter 160 may serve to provide a common interface for the knob 162, such that knobs 162 of different size and dimensions may pressed down and slid onto the upper adapter 160 for mounting to the upper rotatable section 188 of the gimbal encoder 136.

The gimbal encoder 136 may define a gimbal aperture 182 through its center, from the middle of the upper portion of the gimbal encoder 136 through the middle of the lower portion of the gimbal encoder 136. The gimbal aperture 182 may extend through an axis of rotation of the upper rotatable section 188 of the gimbal encoder 136. The LCD housing 164 may define a flat horizontal circular body 222, with an upper stem portion 180 extending vertically downward from the center of the circular body 222. The upper stem portion 180 may be sized to be placed vertically downwards into an upper portion of the vertical height of the gimbal aperture 182 of the gimbal encoder 136. The lower adapter 158 may define a lower stem portion 184 sized to be placed vertically upwards into a lower portion of the vertical height of the gimbal aperture 182 of the gimbal encoder 136. The upper adapter 160 may further define a passthrough 185 at its center to allow for the passage of the upper stem portion 180.

The upper stem portion 180 and the lower stem portion 184 may be configured to interface with one another to collectively form the stem assembly. This may be performed using various approaches such as via snap connection, via glue, etc. This allows for the upper stem portion 180 to remain fixed with respect to the fixed components 102, preventing the LCD housing 164, LCD 172, and LCD window 174 from rotating when the outer knob 162 is rotated. Further aspects of the construction of the stem are discussed in detail with respect to FIGS. 16A-16D, 17, and 18.

The LCD housing 164 may sit on top of the upper adapter 160 on a rail 176 interfacing with a corresponding groove 178 in the upper adapter 160. Because the upper adapter 160 rotates with the knob 162 but the LCD housing 164 does not, this rail 176 and groove 178 design minimizes friction between the rotating and stationary parts of the gimbal assembly 100. As shown, the flat upper surface 204 of the upper adapter 160 defines a circumferential groove 178. A lower surface 214 of the LCD housing 164 defines a corresponding rail 176 which sits into the groove 178, which minimizes friction between rotating and stationary parts and prevents plastic rubbing when the knob 162 is turned. Further aspects of the rail 176 and groove 178 are discussed in detail with respect to FIGS. 14A, 14B and 15.

In addition to the lower stem portion 184, the lower adapter 158 may further provide a projection 216 located to activate the push button 116 when the knob 162 is pressed and the cantilever arms 146 flex. The lower adapter 158 may also facilitate retention of the harness 168, preventing it from interfering with the action of the push button 116.

The LCD 172 may be any of various screens configured to display visual content on the front face of the gimbal assembly 100. The LCD 172 may be sized according to the requirements and dimensions of the knob 162. The LCD 172 may be adhered to the LCD housing 164. The LCD 172 may provide a flexible printed circuit (FPC) tail which may be customized to electrically connect to the bridge PCB assembly 170. In other examples, the LCD 172 may be wired via soldering to the bridge PCB assembly 170.

The LCD window 174 may define an open transparent area for the LCD 172 (masking off the unwanted portion of LCD 172). The LCD window 174 may be attachable to the LCD 172, e.g., with perimeter adhesive (not specifically shown).

The bridge PCB assembly 170 may be configured to convert signals from the LCD 172 and may convert the signals down to fewer connections for electrical interfacing with the simple harness 168 and connect to the gimbal PCB assembly 106. In an example, the signals may include red-green-blue (RGB) signals, mobile industry processor interface (MIPI) signals, and/or serial peripheral interface (SPI) signals.

The bridge PCB assembly 170 may be adhered to the LCD housing 164. The LCD housing 164 is a structural component of the gimbal assembly 100 that provides an interface to the LCD 172 on the top of the gimbal assembly 100. Further details of the construction of the LCD housing 164 are shown with respect to FIGS. 14A-14B.

Figure 3:
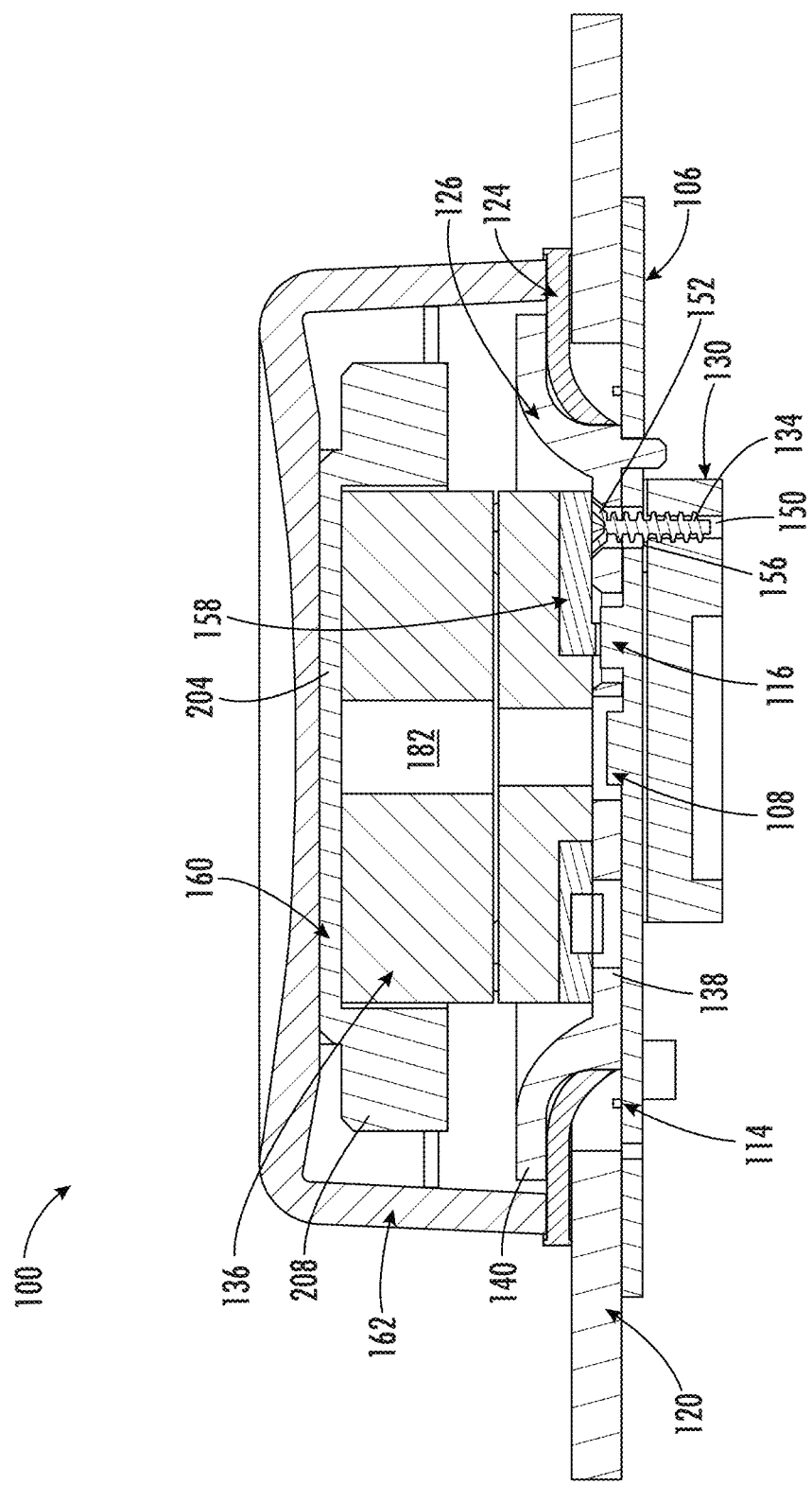
FIG. 3 illustrates an example side cutaway view of an alternate gimbal assembly without the HMI display.

FIG. 3 illustrates an example side cutaway view of an alternate gimbal assembly 100 without the HMI LCD display. FIG. 4 illustrates an example exploded view of the alternate gimbal assembly 100 of FIG. 3. Similar to as discussed above, the alternate gimbal assembly 100 may generally comprise fixed components 102, and movable components 104 rotatably attached to the fixed components 102.

The fixed components 102 may include a gimbal PCB assembly 106 having a 2D sensor 108, LEDs 114, and a push button 116. The PCB adhesive 118 may attach the gimbal PCB assembly 106 to a fascia 120. Above the fascia 120, the fixed components 102 may include a light guide 124 and then the gimbal housing 126 with spring back cantilever feature. Below the fascia 120, the fixed components 102 may include a washer 130, which may be attached to the underside of the gimbal PCB assembly 106 with the PCB adhesive 118. The light guide 124 and gimbal housing 126 may be secured to the upper face of the fascia 120 with screws or other fasteners 134, which may extend through the fascia 120 into the washer 130.

The movable components 104 may include a gimbal encoder 136. The bottom of the gimbal encoder 136 may be attached to the lower adapter 158 (a gimbal-to-housing adapter) using the gimbal adhesive 154. The lower adapter 158 may be designed to rotatably mount into the gimbal housing 126. The top of the gimbal encoder 136 may be attached to an upper adapter 160 (a knob-to-gimbal adapter), in turn onto which a knob 162 is attached. No additional display components are required, and thus, the LCD housing 164, harness 168, bridge PCB assembly 170, LCD 172, and LCD window 174 are omitted. Additionally, the lower adapter 158 omits the lower stem portion 184, as there is no need to facilitate the wiring of the harness 168.

Figure 5:
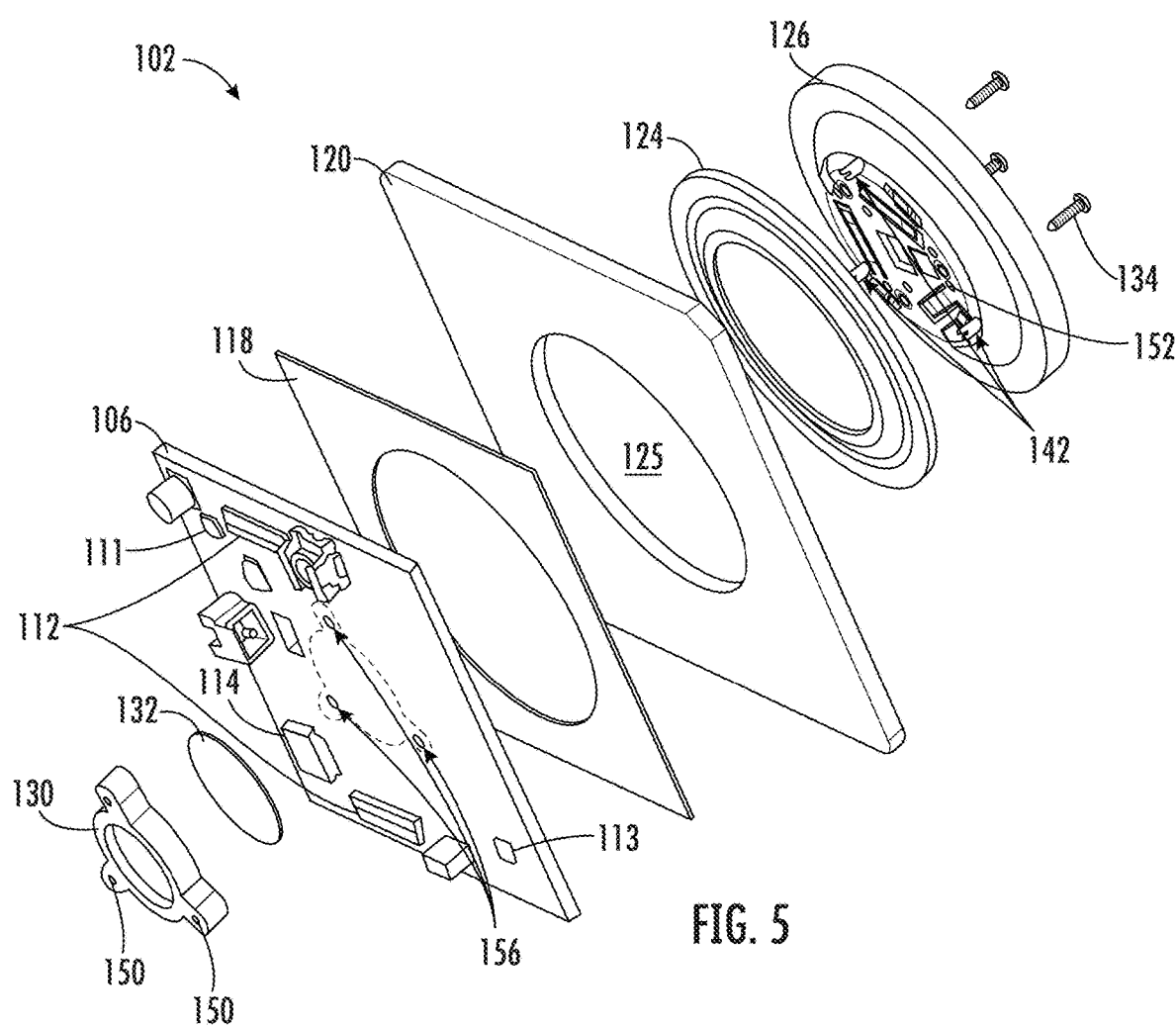
FIG. 5 illustrates an example detail exploded view of the fixed components of the gimbal assembly.
Figure 6:
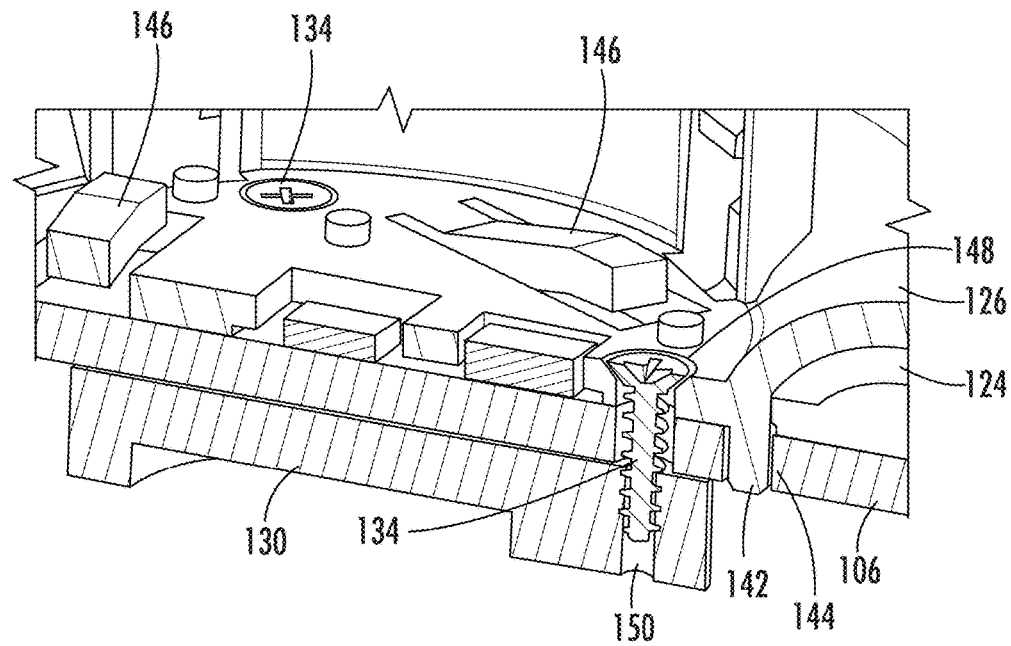
FIG. 6 illustrates an example cutaway perspective view of the fixed components of the gimbal assembly.
Figure 7:
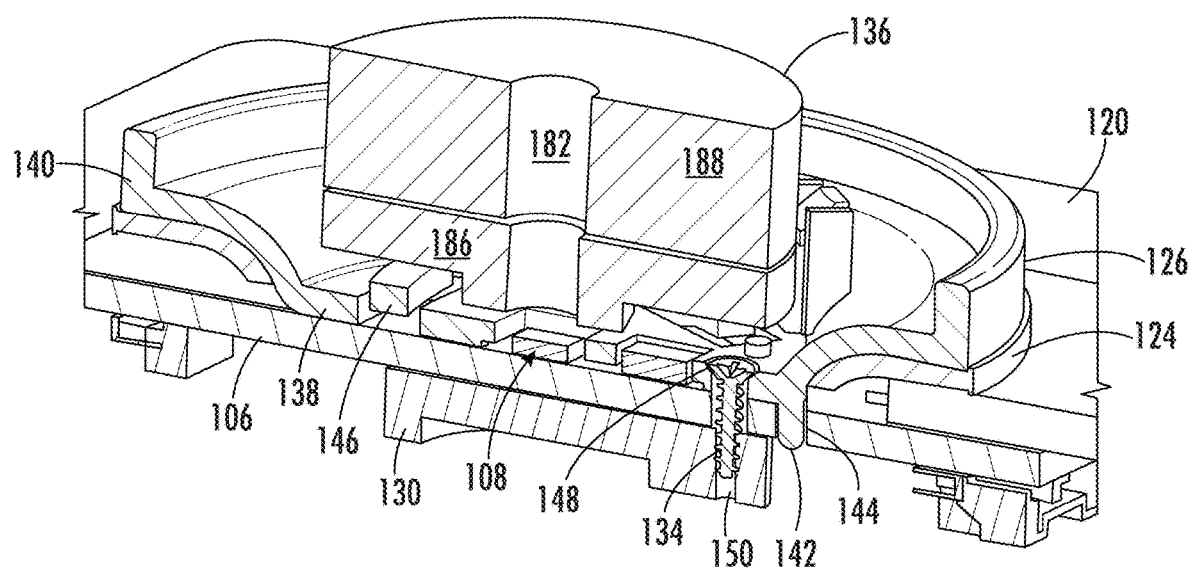
FIG. 7 illustrates an example cutaway perspective view of the fixed components of the gimbal assembly and the placement of the gimbal encoder.

FIG. 5 illustrates an example detail exploded view of the fixed components 102 of the gimbal assembly 100. FIG. 6 illustrates an example cutaway perspective view of the fixed components 102 of the gimbal assembly 100. FIG. 7 illustrates an example cutaway perspective view of the fixed components 102 of the gimbal assembly 100 and the placement of the gimbal encoder 136. Collectively FIGS. 5-7 illustrate the integration of the gimbal encoder 136 with the gimbal housing 126 and the integration of the gimbal housing 126 to the washer 130 and gimbal PCB assembly 106.

Referring more specifically to FIGS. 5-6, the installation path of three fasteners 134 is shown through the fixed components 102 of the gimbal assembly 100. Each of the fasteners 134 passes through a respective one of the spaced apart apertures 152 that lines up with corresponding through holes 156 in the gimbal PCB assembly 106 and threaded holes 150 of the washer 130.

The gimbal housing 126 may be applied into the centered circular opening 125 of the light guide 124 to retain the light guide 124, through the fascia 120. Additionally, the housing locators 142 may be applied into the locator openings 144 of the gimbal PCB assembly 106. The fasteners 134 may then be attached through the apertures 152, through the through holes 156 and secured into the threaded holes 150 of the washer 130 to retain the fixed components 102 together.

Referring to FIG. 7, the gimbal encoder 136 is further shown in relation to the fixed components 102. As can be seen the magnetic sensors 108 of the gimbal PCB assembly 106 are within proximity to the lower fixed section 186 of the gimbal encoder 136 which includes the motor magnet. Thus, the magnetic sensor 108 and magnets of the gimbal encoder 136 are maintained in spaced relation.

Figure 8:
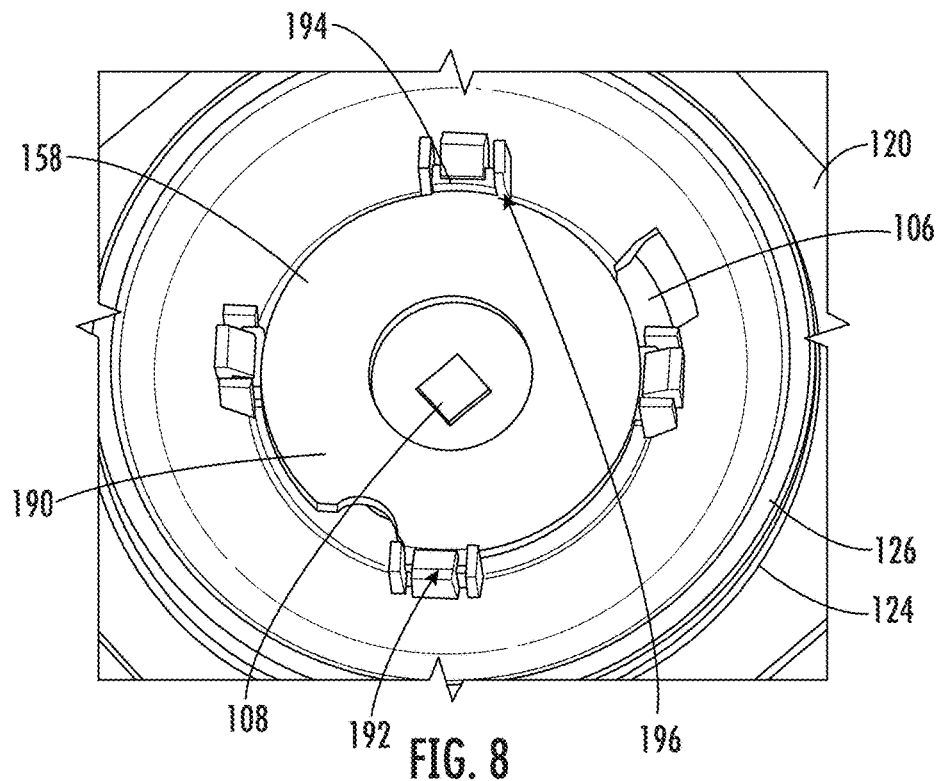
FIG. 8 illustrates an example perspective view of the fixed components of the gimbal assembly and the attachment of the lower adapter into the housing.

FIG. 8 illustrates an example perspective view of the fixed components 102 of the gimbal assembly 100 and the attachment of the lower adapter 158 into the gimbal housing 126. As seen in the example, the lower adapter 158 defines retainer hooks 194 extending laterally outward and, in the illustrated example, upward from the flat body of the lower adapter 158 with respect to the gimbal housing 126. Additionally, the gimbal housing 126 defines snaps 192 that extend around the retainer hooks 194. The snaps 192 may define sloped latches that ride the retainer hooks 194 during insertion of the lower adapter 158 and that snap back over the top of the retainer hooks 194 to engage the hooks and retain the lower adapter 158 in place. Surrounding each of the snaps 192, the gimbal housing 126 may define snap locators 196 extending inwards towards the center of the gimbal housing 126, the snap locators 196 serving to guide placement of the retainer hooks 194 into the snaps 192.

FIG. 9 illustrates an example cutaway perspective view of the alternative gimbal assembly 100 with the attachment of the movable components 104 into the fixed components 102. In addition to the snap engagement of the lower adapter 158 into the gimbal housing 126, the preloading of the cantilever arms 146 can be seen with the lower adapter 158 snapped in. In this snapped position, the cantilever arms 146 maintain the push button 116 in an unpressed state.

FIGS. 10A-10C illustrates example alternative housings 126 having varied cantilever features. For example, as shown in FIG. 10A, the outer end of each of the cantilever arms 146 is connected to the generally flat circular center 128, while the inner end of each of the cantilever arms 146 is connected to an inner circular member as opposed to being free and separately compressible. As shown in FIG. 10B, a set of five cantilever arms 146 is provided in a pentagonal arrangement. In this example, the outer end of each of the cantilever arms 146 is connected to the generally flat circular center 128, while each of the cantilever arms 146 defines a spiral shape extending upwards from the generally flat circular center 128. As shown in FIG. 10C, a set of three cantilever arms 146 is provided in a triangular arrangement. In this example, the outer end of each of the cantilever arms 146 is connected to the generally flat circular center 128, while each of the cantilever arms 146 defines a linear shape extending upwards from the generally flat circular center 128.

FIG. 11 illustrates an example cutaway perspective view of the alternative gimbal assembly 100 with the gimbal encoder 136 spring loaded into the gimbal housing 126 spaced from the magnetic sensor 108. As shown, instead of cantilever arms 146, a spring 187 is inserted between the lower adapter 158 and the gimbal housing 126 to bias the gimbal encoder 136 upwards. Additionally, in this variation the lower fixed section 186 of the gimbal encoder 136 still remains in distance for measurement by the magnetic sensor 108.

Returning back to FIG. 1, the gimbal assembly 100 is illustrated in an example cutaway perspective view with the harness 168 wired through the upper stem portion 180 and lower stem portion 184. As shown, the harness 168 routes from the bridge PCB assembly 170, into the upper stem portion 180, through the upper stem portion 180 into the lower stem portion 184, out the bottom of the lower stem portion 184 and through the gimbal PCB assembly 106. Once through, the harness 168 may be attached to a lower connector 218, and the connector 218 may be applied into the corresponding gimbal PCB connector 112 of the gimbal PCB assembly 106.

FIG. 12 illustrates the LCD housing 164, latch 220, bridge PCB assembly 170 and harness 168 before assembly. As shown, the LCD 172 may be of a generally flat design, with a circular body 221 and a rectangular protrusion 224 extending radially outward from one side of the circular body 221. A c-clip 226 may be sized to extend over the rectangular protrusion 224, with a top leg 228 fitting over the top of the LCD 172 and a bottom leg 230 fitting onto the bottom of the LCD 172. The bottom leg 230 may define a hook 232 extending downward and away from the LCD 172, for securing the bridge PCB assembly 170 to the LCD 172. In an example the bridge PCB assembly 170 may define an opening 234 into which the hook 232 may fit to maintain the bridge PCB assembly 170 against the bottom of the LCD 172. The bridge PCB assembly 170 may further provide a bridge PCB connector 236 for connection of an upper connector 238 of the harness 168.

Figure 13:
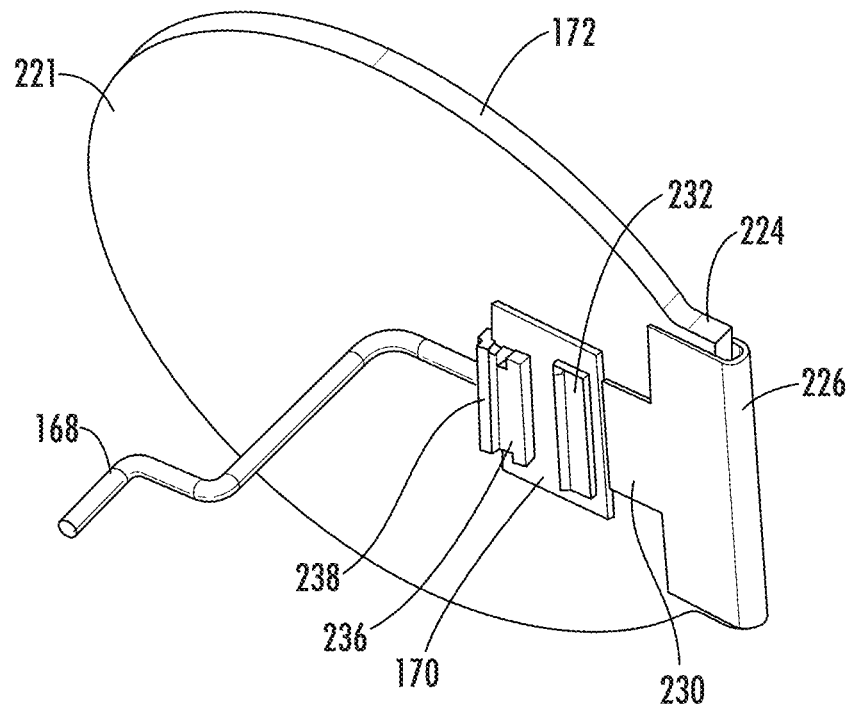
FIG. 13 illustrates the LCD housing, latch, bridge PCB assembly and harness in an assembled state.

FIG. 13 illustrates the LCD housing 164, latch 220, bridge PCB assembly 170 and harness 168 in an assembled state. As shown, the bridge PCB assembly 170 is fixed to the LCD housing 164 by the latch 220, and the upper connector 238 of the harness 168 is connected into the bridge PCB connector 236.

Figure 14A:
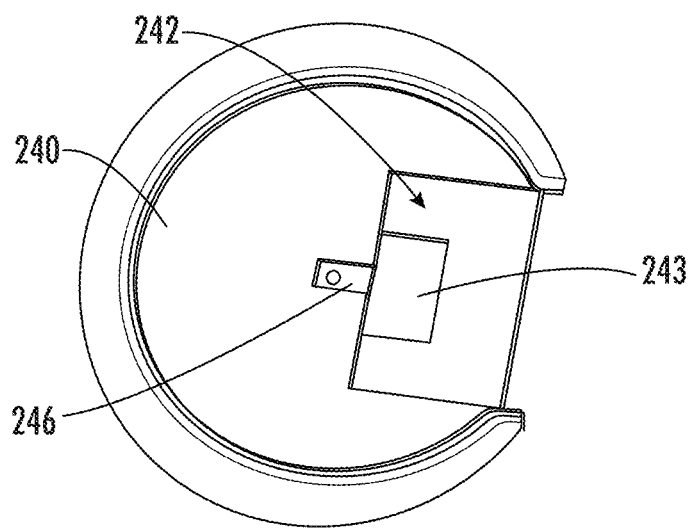
FIG. 14A illustrates an example top view of the LCD housing before attachment of the bridge PCB assembly.

FIG. 14A illustrates a top view of the LCD housing 164 before attachment of the bridge PCB assembly 170. As shown, the circular body 222 of the LCD housing 164 defines an LCD indent 240 into the upper side of the circular body 222, sized to receive the outer contour of the LCD 172. This allows the LCD 172 to be placed into the LCD housing 164. As the LCD 172 is asymmetrical, the LCD 172 may be placed into the LCD housing 164 in a single orientation securing the LCD 172 into a single orientation once placed into the LCD indent 240.

The LCD housing 164 also defines a PCB indent 242 sized to receive the bridge PCB assembly 170. The PCB indent 242 may be defined as a further sunken portion of the LCD indent 240, allowing the bridge PCB assembly 170 to be placed below the LCD 172. A portion of the PCB indent 242 may define a PCB through hole 243 providing clearance to the bridge PCB connector 236 and allowing the harness 168 to extend from below the LCD housing 164.

The PCB indent 242 may also define a channel 246 connecting the PCB indent 242 to the center of the upper stem portion 180. This allows for the harness 168 to extend from the PCB indent 242 to a wiring channel 212 between the LCD housing 164 and the LCD 172.

The cutaway of FIG. 1 illustrates the profile of the rail 176 of the circular body 222 of the LCD housing 164 interfacing into the groove 178 of the upper adapter 160. The circular groove 178 may be best seen in FIG. 14B, while the groove 178 may be best seen in FIG. 15.

Figure 14B:
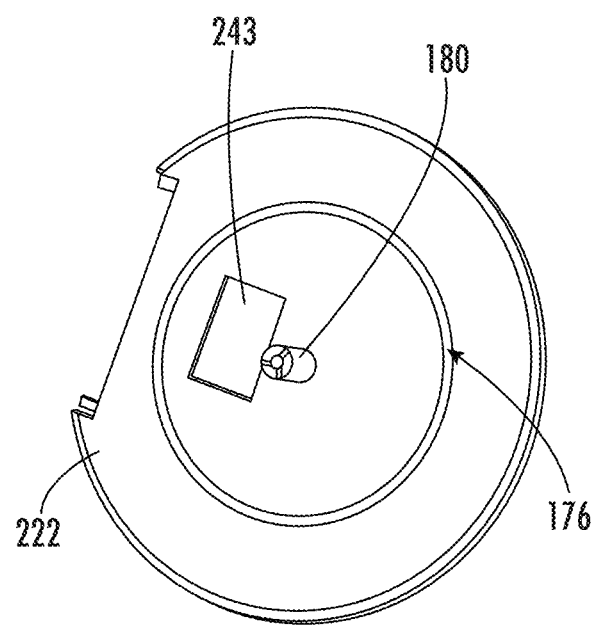
FIG. 14B illustrates an example bottom view of the LCD housing before attachment of the bridge PCB assembly.

FIG. 14B illustrates an example bottom view of the LCD housing 164 before attachment of the bridge PCB assembly 170. In this view, the lower side of the PCB through hole 243 is shown. Additionally, the rail 176 and upper stem portion 180 may each be seen extending from the bottom surface of the LCD housing 164.

Figure 15:
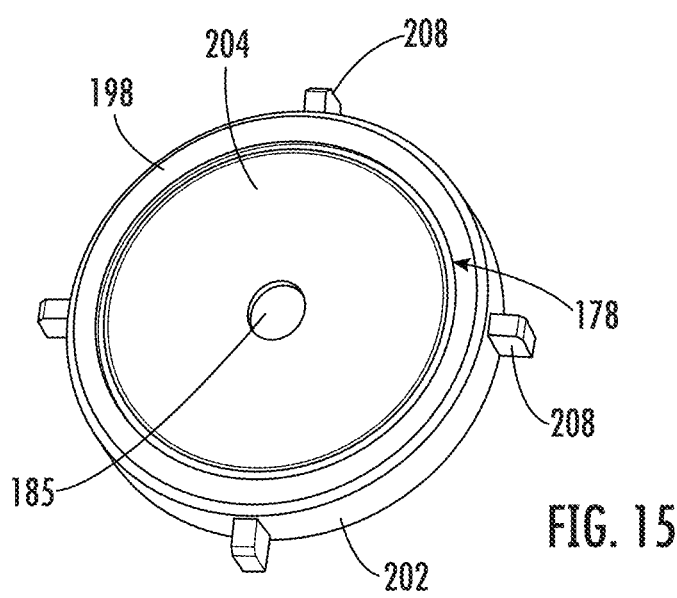
FIG. 15 illustrates an example top view of the upper adapter showing the groove.

FIG. 15 illustrates an example top view of the upper adapter 160. As shown, the flat upper surface 204 of the upper adapter 160 defines the circumferential groove 178 corresponding to the profile of the rail 176 of the LCD housing 164. The knob locators 208 extending circumferential outward from the rounded exterior sides 198 of the upper adapter 160 may also be seen in this view.

Figure 16A:
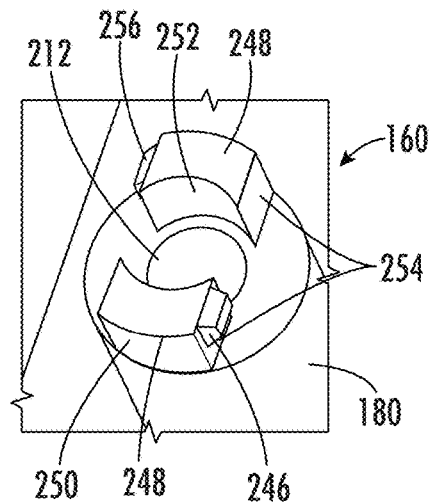
FIG. 16A illustrates an example closeup perspective view of the upper stem of the upper adapter.

FIG. 16A illustrates an example closeup view of the upper stem portion 180 of the upper adapter 160. As shown, the upper stem portion 180 may define a generally cylindrical body around the hollow wiring channel 212.

The lower end of the upper stem portion 180 terminate in two upper arc segments 248. Each of the upper arc segments 248 are defined as the portion of the cylinder between two spaced-apart parallel chords (not specifically shown) centered at the center of the upper stem portion 180. The upper arc segments 248 define a smoothly curved outer surface 250 that follows the contour of the upper stem portion 180, and a smoothly curved inner surface 252 that follows the contour of a cylinder of greater radius than the wiring channel 212 but less than that of the upper stem portion 180. The upper arc segments 248 also define parallel flat, rectangular surfaces 254 on either side of curved surfaces 250, 252 along the chords.

Each of the upper arc segments 248 defines a protrusion 256 extending from an opposite one of its rectangular surfaces 254. These protrusions 256 are illustrated as trapezoidal prisms tapering away from the rectangular surfaces 254.

Figure 16B:
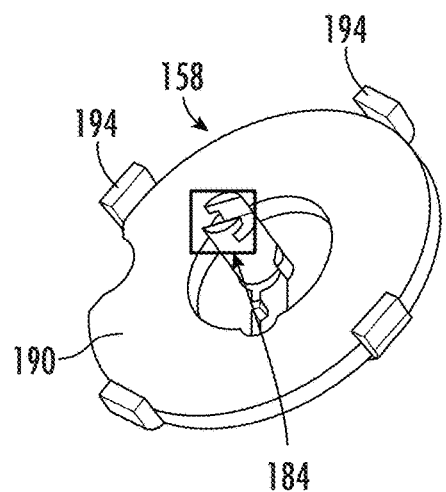
FIG. 16B illustrates an example perspective view of the lower adapter.
Figure 16C:
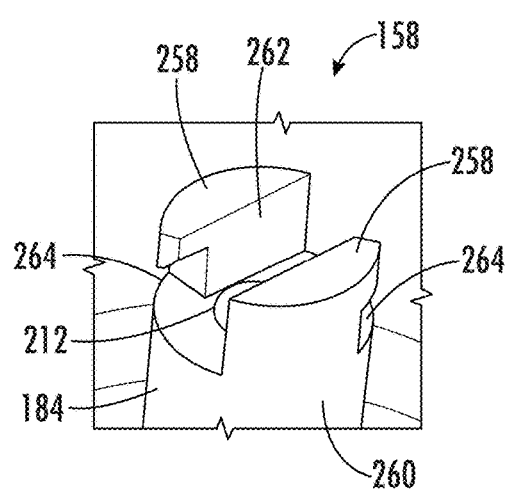
FIG. 16C illustrates an example closeup perspective view of the lower stem of the lower adapter.

FIG. 16B illustrates an example perspective view of the lower adapter 158. FIG. 16C illustrates an example closeup view of the lower stem portion 184 of the lower adapter 158. As shown, the lower stem portion 184 also defines a central cylindrical body of the same diameter as the upper stem portion 180. Two lower arc segments 258 extend upward from the top surface of the central cylindrical body, defined by the area on the opposite side of the chords defining the upper arc segments 248. Each lower arc segment 258 thus defines a semi-circular profile that, when viewed from above, forms a crescent shape. The outer surfaces 260 of the lower arc segments 258 follow the curvature of the central cylinder, while the inner faces 262 are straight. The lower arc segments 258 are positioned opposite one another, creating a symmetrical structure around the central body. The arrangement forms a rectangular gap between the inner faces 262 of the lower arc segments 258 which corresponds to the collective width bounded by the rectangular surfaces 254 of the upper arc segments 248.

Additionally, each of the lower arc segments 258 defines a receiving channel 264. The receiving channels 264 may be defined below the top of the lower arc segments 258 and sized to receive a corresponding one of the protrusions 256 of the upper arc segments 248. The upper stem portion 180 and the lower stem portion 184 may accordingly be attached by inserting one into the other.

Figure 16D:
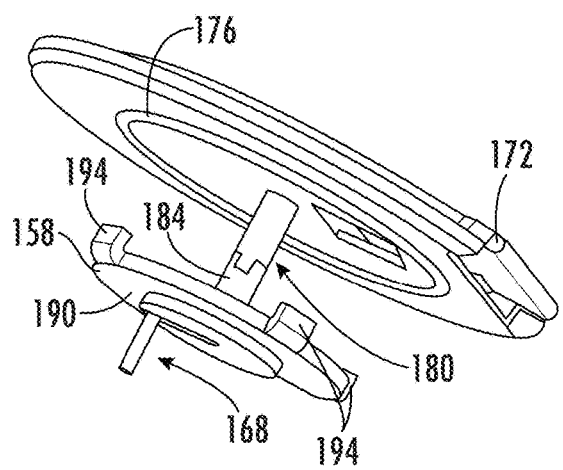
FIG. 16D illustrates an example perspective view of the upper stem portion and lower stem portion connected together.

FIG. 16D illustrates an example perspective view of the upper stem portion 180 and lower stem portion 184 connected together. As shown, the stem formed by the upper stem portion 180 and the lower stem portion 184 defines the full wiring channel 212 through which the harness 168 may pass. This allows for the harness 168 to run from the LCD 172 to the gimbal PCB assembly 106 without tangling or imparting stress on the electrical connections of the harness 168.

Figure 17:
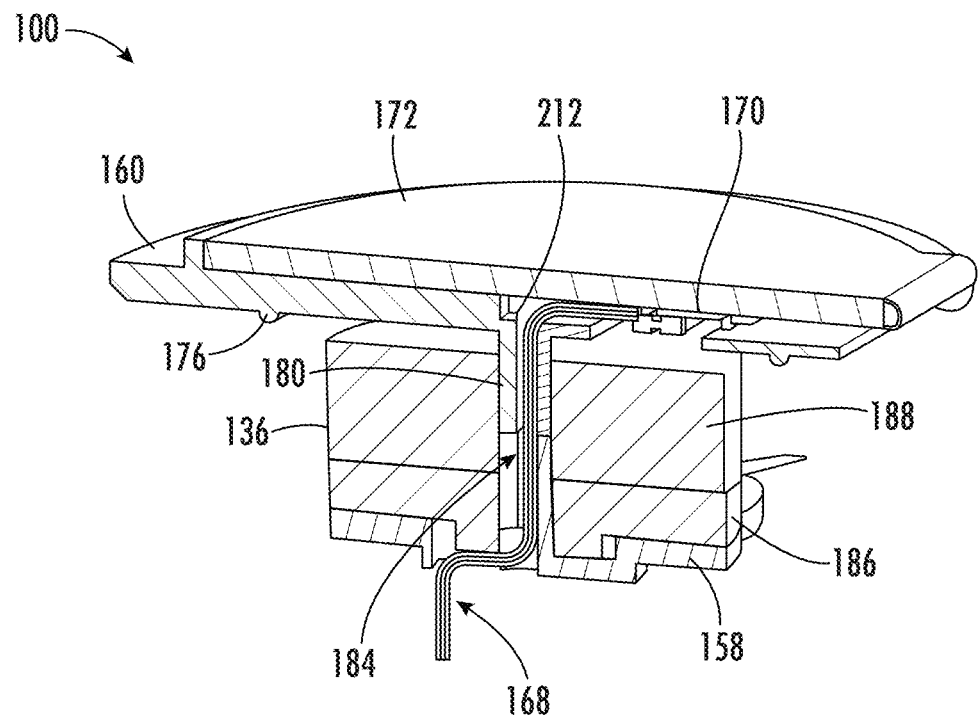
FIG. 17 illustrates an example cutaway perspective view of the LCD, LCD housing, gimbal encoder, lower adapter, and harness connected together.

FIG. 17 illustrates an example cutaway perspective view of the LCD 172, LCD housing 164, gimbal encoder 136, lower adapter 158, and harness 168 connected together. As shown, the harness 168 is routed from the LCD 172, through the LCD housing 164, and through the lower adapter 158.

Figure 18:
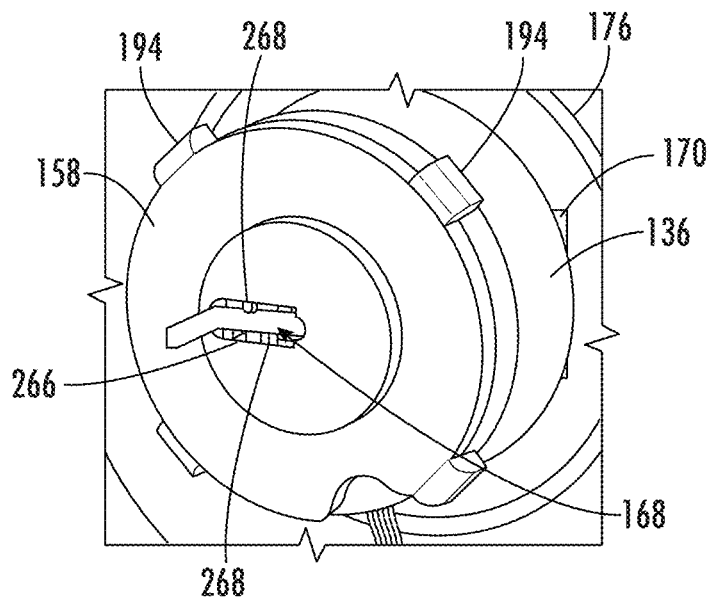
FIG. 18 illustrates an example bottom view of the lower adapter assembled as shown in FIG. 17, illustrating the retention of the harness.

FIG. 18 illustrates an example bottom view of the lower adapter 158 assembled as shown in FIG. 17, illustrating the retention of the harness 168. As shown, the lower adapter 158 may define a cable retainer 266 to receive the harness 168 exiting the wiring channel 212. As shown, the cable retainer 266 is defined as an opening into the generally flat body 190 of the lower adapter 158, with retainer protrusions 268 extending inwards from alternate sides of the cable retainer 266. This allows for the harness 168 to be secured into position by the lower adapter 158, preventing the harness 168 from moving inside and/or around in the wiring channel 212.

A method of assembly of the gimbal assembly 100 may include assembling the components into subassemblies. A combination of the subassemblies may then be performed to combine the subassemblies to form the overall gimbal assembly 100.

A first subassembly is created by assembling the gimbal PCB assembly 106 to the fascia 120. Additionally, the washer 130 is assembled to the gimbal PCB assembly 106. Further, the fasteners 134 are passed through the gimbal housing 126 and the gimbal PCB assembly 106 into the washer 130 on the underside of the gimbal PCB assembly 106.

A second subassembly is created by assembling the lower adapter 158 to the bottom stationary portion of the gimbal encoder 136. Additionally, the upper adapter 160 is assembled to the top rotating portion of the gimbal encoder 136. Then, the knob 162 is assembled onto the upper adapter 160.

A third subassembly is created by assembling the LCD window 174 to the LCD 172, e.g., using perimeter adhesive. The bridge PCB assembly 170 is then assembled to the back of the LCD 172. The harness 168 is threaded from the bridge PCB assembly 170 into the center of the upper stem portion 180 of the LCD housing 164. The LCD 172 and LCD window 174 are then then assembled to the LCD housing 164.

A fourth subassembly is created by assembling the third subassembly onto the second subassembly. This may be done by threading the harness 168 through the lower stem portion 184 of the lower adapter 158. Additionally, a connector 218 may be soldered to the end of the harness 168 having passed through the lower stem portion 184. This connector 218 may be used to connect to the gimbal PCB assembly 106.

The gimbal assembly 100 may now be assembled by assembling the light guide 124 onto the fascia 120. Additionally, the fourth subassembly is assembled onto the first subassembly, such that the lower adapter 158 snaps into the gimbal housing 126. The harness 168 may be threaded with the connected through the gimbal PCB assembly 106, and the cantilever features of the gimbal housing 126 are pre-loaded. The connector 218 from the harness 168 may then be attached to the gimbal PCB assembly 106.

A method of assembly of the alternate gimbal assembly 100 may include assembling the components into subassemblies. A combination of the subassemblies may then be performed to combine the subassemblies to form the overall gimbal assembly 100.

A first subassembly is created by assembling the gimbal PCB assembly 106 to the fascia 120 with the fixtures. Additionally, the washer 130 is assembled to the gimbal PCB assembly 106. Further, the fasteners 134 are passed through the gimbal housing 126 and the gimbal PCB assembly 106 into the washer 130 on the underside of the gimbal PCB assembly 106.

A second subassembly is created by assembling the lower adapter 158 to the bottom stationary portion of the gimbal encoder 136. Additionally, the upper adapter 160 is assembled to the top rotating portion of the gimbal encoder 136.

The alternate gimbal assembly 100 may now be assembled by assembling the light guide 124 onto the fascia 120. Additionally, the second subassembly is assembled onto the first subassembly, such that the lower adapter 158 snaps into the gimbal housing 126. Then, the knob 162 is assembled onto the upper adapter 160. (The third subassembly is not required, as the knob 162 lacks the LCD window 174, LCD 172, bridge PCB assembly 170, and harness 168.)

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A gimbal assembly, comprising:
a gimbal encoder having a lower fixed section and an upper rotatable section, the gimbal encoder defining a gimbal aperture through an axis of rotation of the upper rotatable section;
a liquid crystal display (LCD) housing configured to hold an LCD, the LCD housing defining a flat circular body and an upper stem portion extending perpendicularity downward from the center of the circular body, the upper stem portion being sized to be placed vertically downwards into an upper portion of the gimbal aperture; and
a lower adapter defining a lower stem portion sized to be placed vertically upwards into a lower portion of the gimbal aperture,
wherein the upper stem portion and the lower stem portion are configured to interface with one another to collectively form a two-piece stem.

2. The gimbal assembly of claim 1, wherein the upper stem portion and the lower stem portion collectively define a wiring channel within the aperture for passing a harness through the two-piece stem.

3. The gimbal assembly of claim 2, wherein the LCD housing defines a printed circuit board (PCB) indent sized to receive a bridge PCB assembly, the bridge PCB assembly configured to converts signals from the LCD to fewer wired connections for electrical interfacing with the harness and connection to a gimbal PCB assembly.

4. The gimbal assembly of claim 3, further comprising a c-clip securing the bridge PCB assembly to the LCD.

5. The gimbal assembly of claim 1, wherein the gimbal encoder includes a lower fixed section and an upper rotatable section, the lower adapter is attached to the lower fixed section, and the upper stem portion remains remain fixed with respect to the lower fixed section, preventing the LCD housing from rotating when the knob attached to the upper rotatable section of the gimbal encoder is rotated.

6. The gimbal assembly of claim 5, further comprising an upper adapter attachable to the upper rotatable section of the gimbal encoder, the upper adapter configured to interface between the knob and the upper rotatable section of the gimbal encoder.

7. The gimbal assembly of claim 6, wherein a flat upper surface of the upper adapter defines a circumferential groove and a lower surface of the LCD housing defines a corresponding rail configured to be received by the groove, thereby minimizing friction between rotating and stationary parts when the knob is turned.

8. The gimbal assembly of claim 6, wherein the upper adapter defines knob locators that extend circumferential outward from rounded exterior sides of the upper adapter, the knob locators sized to be received by and lock into open-bottomed apertures defined by an inner surface of the knob.

9. The gimbal assembly of claim 1, further comprising a gimbal housing defining a generally flat circular center, the lower adapter including a generally flat body contoured on a lower face to fit into the generally flat circular center of the gimbal housing, the gimbal housing configured receive and mount the lower adapter into the gimbal housing.

10. The gimbal assembly of claim 9, wherein the generally flat circular center is surrounded by a flange extending upwards and outwards from the center, such that a light guide fits between a fascia and the gimbal housing.

11. The gimbal assembly of claim 9, wherein the lower adapter includes retainer hooks extending laterally outward from the flat body of the lower adapter, and wherein the gimbal housing includes snaps that define sloped latches that ride the retainer hooks during insertion of the lower adapter and that snap back over the top of the retainer hooks to engage the hooks and retain the lower adapter in place.

12. The gimbal assembly of claim 11, wherein surrounding each of the snaps, the gimbal housing defines snap locators extending inwards towards the center of the gimbal housing, the snap locators serving to guide placement of the retainer hooks into the snaps.

13. The gimbal assembly of claim 10, wherein the gimbal housing defines a set of cantilever arms providing upward biasing of the lower adapter away from a push button.

14. The gimbal assembly of claim 13, wherein the lower adapter includes a projection located to activate the push button when the gimbal encoder is pressed and the cantilever arms flex downwards.

15. The gimbal assembly of claim 14, wherein a first end of each of the cantilever arms is connected to the generally flat circular center of the gimbal housing, and a second end of each of the cantilever arms is connected to an inner circular member.

16. The gimbal assembly of claim 14, wherein each of the cantilever arms defines a spiral shape connected at a first end to the generally flat circular center of the gimbal housing and extending upwards from the generally flat circular center to a free end.

17. The gimbal assembly of claim 14, wherein a first outer end of each of the cantilever arms is connected to the generally flat circular center and defines a linear shape extending upwards from the generally flat circular center to a free end.

18. The gimbal assembly of claim 1, wherein a lower end of the upper stem portion defines two upper arc segments, each of the upper arc segments, and an upper end of the lower stem portion defines two lower arc segments extending upward from the lower stem portion, such that the two upper arc segments and the two lower arc segments mate to connect the upper stem portion and the lower stem portion.

19. The gimbal assembly of claim 18, wherein the two upper arc segments are defined as a portion of the upper stem portion between two spaced-apart parallel chords centered at the center of the upper stem portion, and the two lower arc segments are defined by an area on the opposite side of the chords defining the upper arc segments.

20. The gimbal assembly of claim 19, wherein each of the upper arc segments defines a protrusion extending from an opposite one of its side surfaces, and each of the lower arc segments defines a receiving channel sized to receive a corresponding one of the protrusions of the upper arc segments.

\* \* \* \* \*